(12) United States Patent
Katti et al.

(10) Patent No.: US 12,411,749 B2
(45) Date of Patent: Sep. 9, 2025

(54) APPARATUS, METHOD, AND COMPUTER PROGRAM PRODUCT FOR TRACKING CHANGES TO OBJECT MODELS FOR OPERATIONAL SYSTEMS

(71) Applicant: Honeywell International Inc., Charlotte, NC (US)

(72) Inventors: Shirish Katti, Bangalore (IN); Veeranagegowda Shivalingappa, Chitradurga (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/187,375

(22) Filed: Mar. 21, 2023

(65) Prior Publication Data

US 2024/0320116 A1 Sep. 26, 2024

(51) Int. Cl.
G06F 11/30 (2006.01)

(52) U.S. Cl.
CPC .............................. G06F 11/3072 (2013.01)

(58) Field of Classification Search
CPC .... G06F 11/3072; G06F 16/2358; G06F 8/65; G06F 21/552; G06F 16/23; G06F 2201/87; G06F 9/466
USPC ........................................................ 707/703
See application file for complete search history.

(56) References Cited

U.S. PATENT DOCUMENTS

| | | | | |
|---|---|---|---|---|
| 2011/0153767 A1* | 6/2011 | Coldicott | ................... | G06F 8/24 709/207 |
| 2019/0137983 A1* | 5/2019 | Subramaniyan | ........ | G06F 17/18 |
| 2019/0287488 A1* | 9/2019 | Yanagihara | ............ | G05B 23/02 |
| 2020/0370777 A1* | 11/2020 | Kabler | ..................... | F24F 11/38 |
| 2022/0138397 A1* | 5/2022 | Han | ...................... | G06F 30/398 716/100 |
| 2023/0325737 A1* | 10/2023 | Xu | ................... | G06Q 10/06313 705/7.23 |
| 2024/0142127 A1* | 5/2024 | Picardi | ................... | G05B 15/02 |

* cited by examiner

*Primary Examiner* — Phong H Nguyen
(74) *Attorney, Agent, or Firm* — ALSTON & BIRD LLP

(57) ABSTRACT

An extensible object model system for maintaining extensible object models representing operational systems detects changes to the extensible object models generated by an enterprise management system and generates change events identifying and/or characterizing the detected changes, possibly based on publish events from the enterprise management system associated with particular operations that generated the detected changes. The extensible object model system generates notifications based on the change events and configurable notification criteria and provides a change event interface (e.g., UI, API) for providing change events to the enterprise management system in response to change event requests received via the change event interface. The extensible object model system generates change audit reports and/or recovered extensible object models based on the change events and/or causes the enterprise management system to generate updated operational data processing criteria based on the change events.

20 Claims, 9 Drawing Sheets

APPARATUS, METHOD, AND COMPUTER PROGRAM PRODUCT FOR TRACKING CHANGES TO OBJECT MODELS FOR OPERATIONAL SYSTEMS

TECHNICAL FIELD

Embodiments of the present disclosure generally relate to extensible object models for operational systems, and specifically, in some examples, to tracking changes to extensible object models representing operational systems.

BACKGROUND

Applicant has identified example technical challenges and difficulties associated with current solutions for tracking changes to extensible object models representing operational systems. Through applied effort, ingenuity, and innovation, Applicant has solved problems relating to tracking changes to extensible object models representing operational systems.

BRIEF SUMMARY

According to one aspect, example embodiments of the present disclosure include an apparatus comprising at least one processor and at least one non-transitory memory comprising program code stored thereon. The at least one non-transitory memory and the program code are configured to, with the at least one processor, cause the apparatus to at least detect changes to one or more extensible object models representing one or more operational systems, in response to detecting the changes to the one or more extensible object models, generate change events representing the detected changes based at least in part on the detected changes, store the change events in one or more data repositories associated with an enterprise management system for managing the one or more operational systems, transmit the change events to the enterprise management system, and cause the enterprise management system to perform one or more monitoring and control operations with respect to the one or more operational systems based at least in part on the change events.

In some embodiments, the at least one non-transitory memory and the program code are configured to, with the at least one processor, further cause the apparatus to at least: present a change event interface configured to receive change event requests; receive change event requests from the enterprise management system via the change event interface; and transmit the change events to the enterprise management system in response to receiving the change event requests based at least in part on the change event requests.

In some embodiments, the at least one non-transitory memory and the program code are configured to, with the at least one processor, further cause the apparatus to at least: generate change notifications based at least in part on the change events; transmit the change notifications to the enterprise management system; and cause the enterprise management system to perform the one or more monitoring and control operations with respect to the one or more operational systems based at least in part on the change notifications. The change notifications may be generated based at least in part on configurable notification criteria. Generating the change notifications may comprise generating at least one change notification corresponding to a change event in response to determining that all changes to an extensible object model, of the one or more extensible object models, indicated in the change event are complete.

In some embodiments, the at least one non-transitory memory and the program code are configured to, with the at least one processor, further cause the apparatus to at least generate a recovered extensible object model corresponding to a particular extensible object model of the one or more extensible object models based at least in part on a subset of the change events associated with the particular extensible object model.

In some embodiments, the at least one non-transitory memory and the program code are configured to, with the at least one processor, further cause the apparatus to at least generate a change audit report for a particular extensible object model of the one or more extensible object models based at least in part on a subset of the change events associated with the particular extensible object model, wherein the change audit report comprises a change log indicating all changes to the particular extensible object model.

In some embodiments, the at least one non-transitory memory and the program code are configured to, with the at least one processor, further cause the apparatus to at least cause the enterprise management system to generate updated operational data processing criteria based at least in part on the change events and to process operational data associated with the one or more operational systems based at least in part on the updated operational data processing criteria.

In some embodiments, the one or more extensible object models are stored in a graph database, and the change events are defined in a file or data interchange format and are stored in a document database.

In some embodiments, each of the change events comprises a change event identifier and change data characterizing one or more changes, of the detected changes, associated with a particular extensible object model of the one or more extensible object models, including one or more one changed attributes of the particular extensible object model, a previous value of each of the one or more changed attributes, and a changed value of each of the one or more changed attributes.

According to another aspect, embodiments of the present invention feature a method comprising detecting changes to one or more extensible object models representing one or more operational systems, in response to detecting the changes to the one or more extensible object models, generating change events representing the detected changes based at least in part on the detected changes, storing the change events in one or more data repositories associated with an enterprise management system for managing the one or more operational systems, transmitting the change events to the enterprise management system, and causing the enterprise management system to perform one or more monitoring and control operations with respect to the one or more operational systems based at least in part on the change events.

According to another aspect, embodiments of the present invention feature a computer program product comprising at least one non-transitory computer-readable storage medium having computer-readable program code portions stored therein. The computer-readable program code portions comprise an executable portion configured to: detect changes to one or more extensible object models representing one or more operational systems, in response to detecting the changes to the one or more extensible object models, generate change events representing the detected changes based at least in part on the detected changes, store the change events in one or more data repositories associated with an enterprise management system for managing the one or more operational systems, transmit the change events to the enterprise management system, and cause the enterprise management system to perform one or more monitoring and control operations with respect to the one or more operational systems based at least in part on the change events.

The above summary is provided merely for the purpose of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject will become apparent from the description, the drawings, and the claims.

BRIEF DESCRIPTION OF THE DRAWINGS

Figure 1:
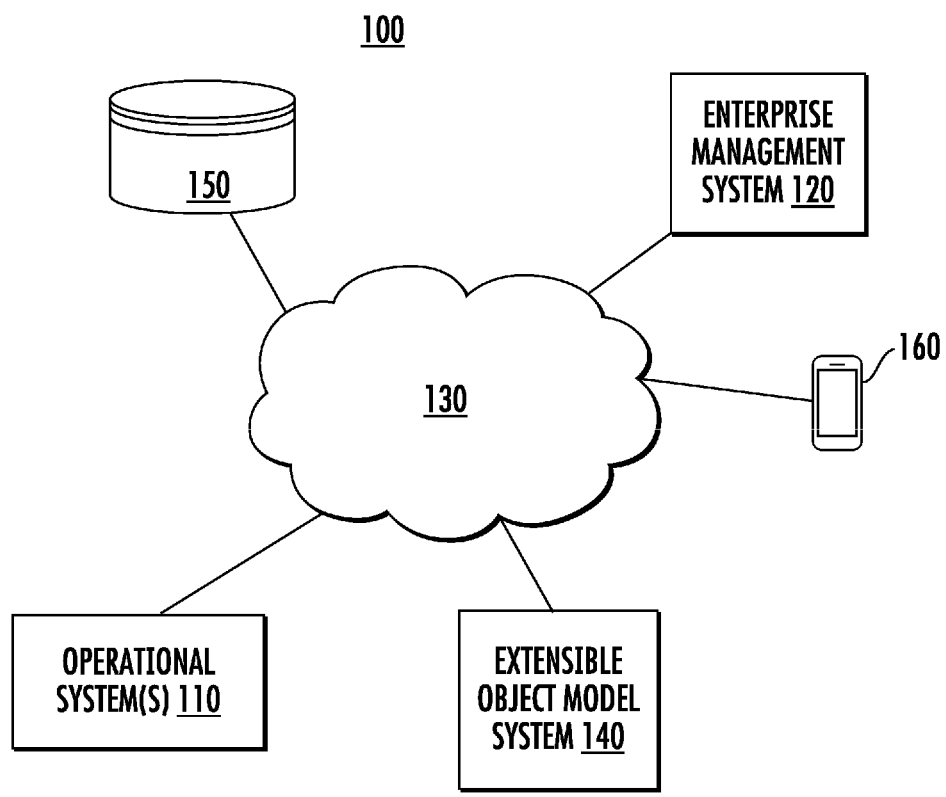
Figure 2:
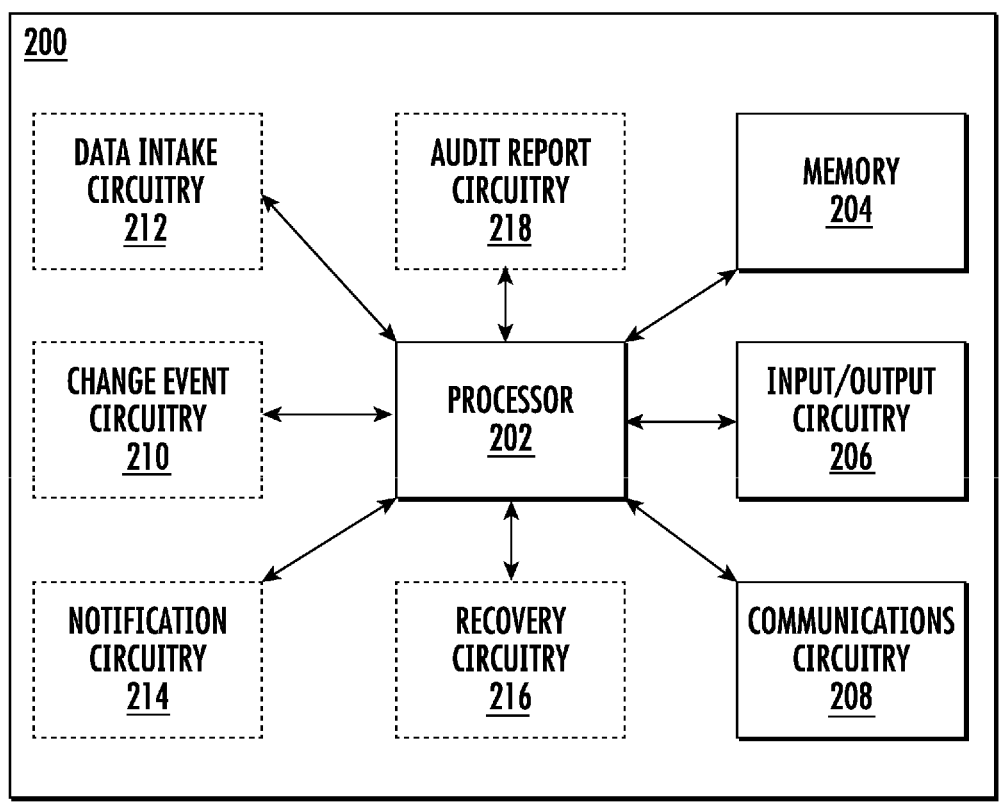
Figure 3:
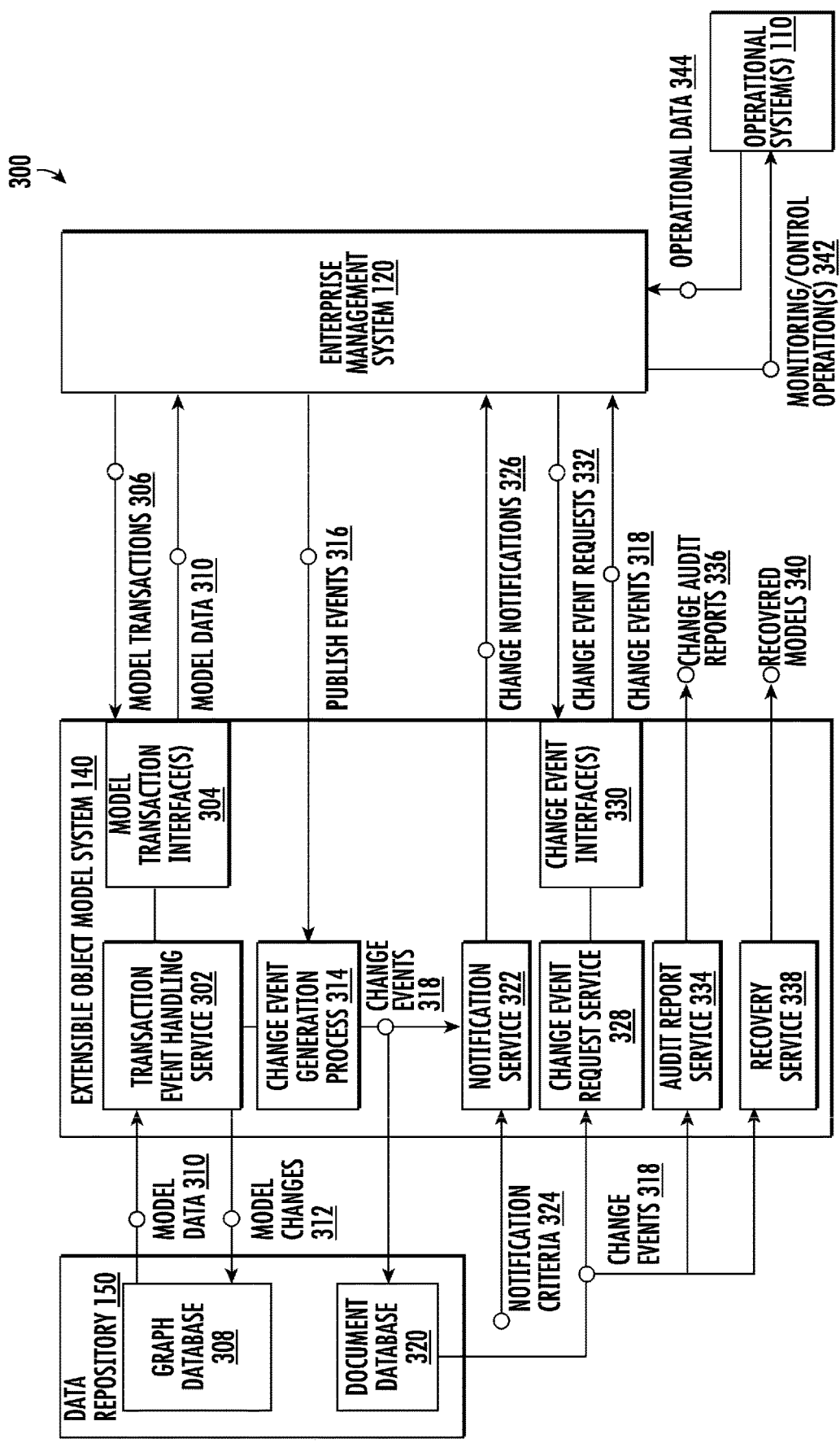
Figure 4:
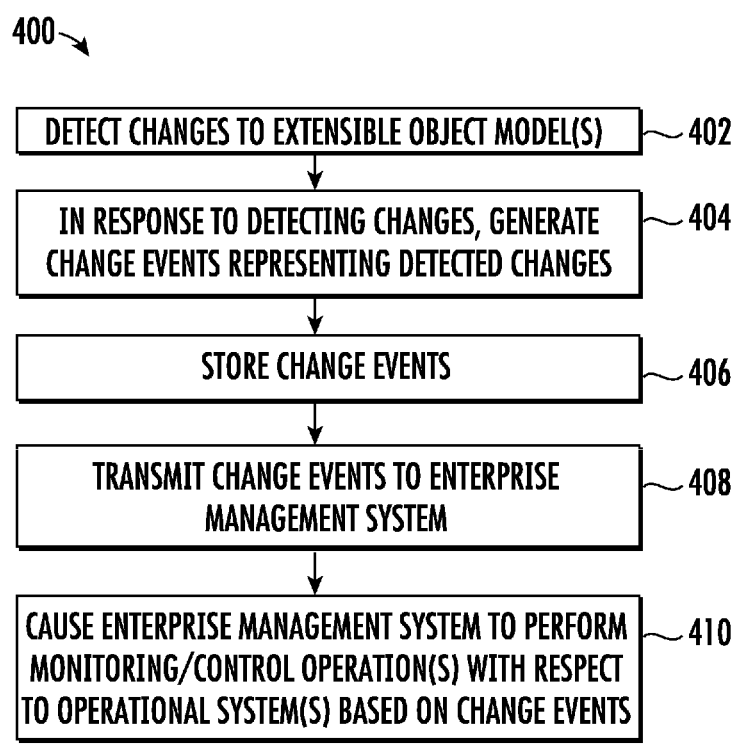
Figure 5:
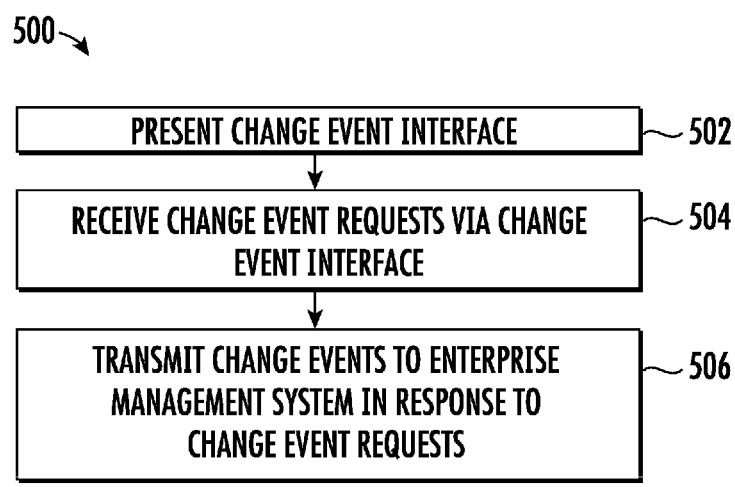
Figure 6:
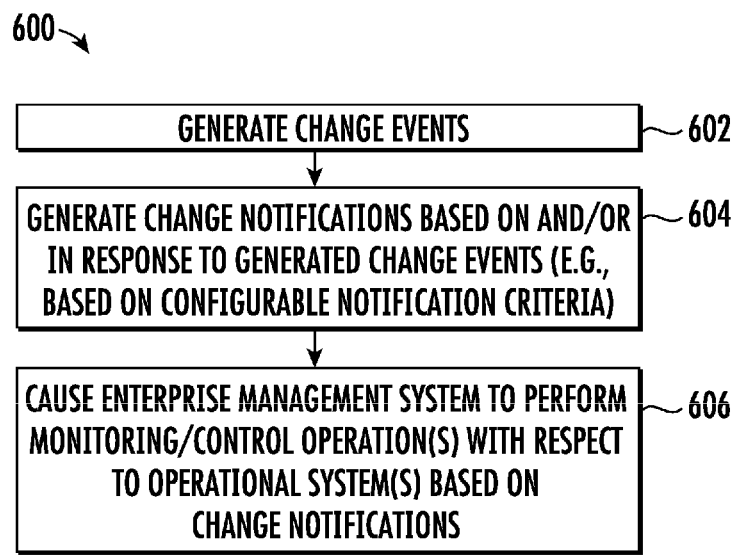
Figure 7:
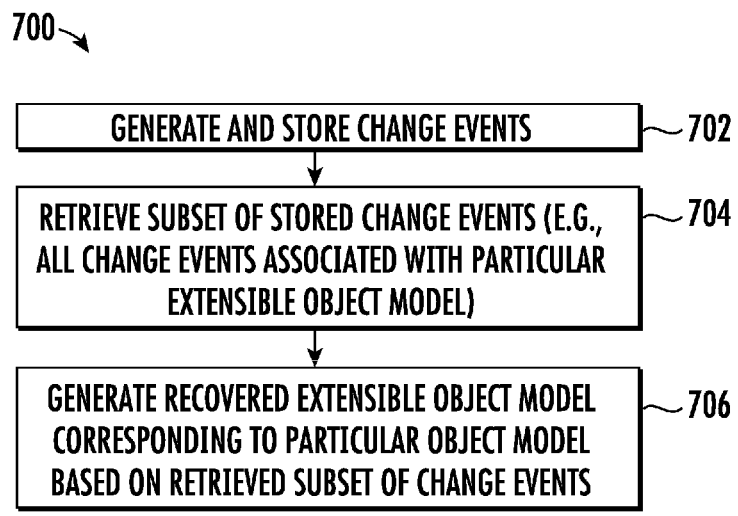
Figure 8:
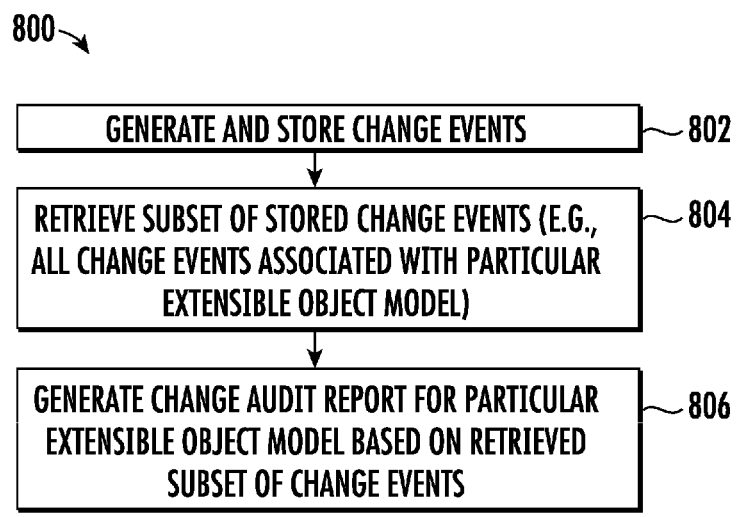
Figure 9:
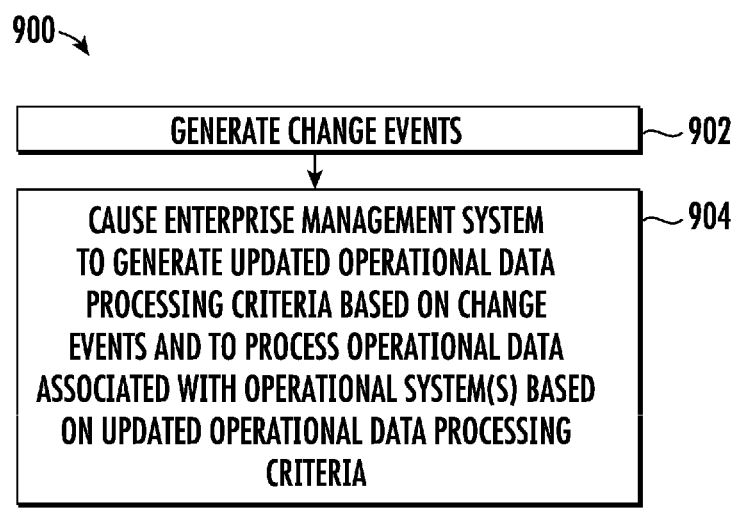

Having thus described the embodiments of the disclosure in general terms, reference now will be made to the accompanying drawings, which are not necessarily drawn to scale, and wherein:

FIG. 1 illustrates an exemplary block diagram of an environment in which embodiments of the present disclosure may operate;

FIG. 2 illustrates an exemplary block diagram of an example apparatus that may be specially configured in accordance with an example embodiment of the present disclosure;

FIG. 3 illustrates an exemplary extensible object model system, in accordance with at least some example embodiments of the present disclosure;

FIG. 4 is a flowchart depicting an example process for generating and using change events, in accordance with at least some example embodiments of the present disclosure;

FIG. 5 is a flowchart depicting an example process for providing the change events via a change event interface, in accordance with at least some example embodiments of the present disclosure;

FIG. 6 is a flowchart depicting an example process for generating change notifications, in accordance with at least some example embodiments of the present disclosure;

FIG. 7 is a flowchart depicting an example process for generating a recovered extensible object model based on stored change events, in accordance with at least some example embodiments of the present disclosure;

FIG. 8 is a flowchart depicting an example process for generating a change audit report based on stored change events, in accordance with at least some example embodiments of the present disclosure; and FIG. 9 is a flowchart depicting an example process for updating operational data processing criteria based on change events, in accordance with at least some example embodiments of the present disclosure.

DETAILED DESCRIPTION

Some embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

The use of the term "circuitry" as used herein with respect to components of a system or an apparatus should be understood to include particular hardware configured to perform the functions associated with the particular circuitry as described herein. The term "circuitry" should be understood broadly to include hardware and, in some embodiments, software for configuring the hardware. For example, in some embodiments, "circuitry" may include processing circuitry, communication circuitry, input/output circuitry, and the like. In some embodiments, other elements may provide or supplement the functionality of particular circuitry. Alternatively or additionally, in some embodiments, other elements of a system and/or apparatus described herein may provide or supplement the functionality of another particular set of circuitry. For example, a processor may provide processing functionality to any of the sets of circuitry, a memory may provide storage functionality to any of the sets of circuitry, communications circuitry may provide network interface functionality to any of the sets of circuitry, and/or the like.

The term "electronically coupled," "electronically coupling," "electronically couple," "in communication with," "in electronic communication with," or "connected" in the present disclosure refers to two or more elements or components being connected through wired means and/or wireless means, such that signals, electrical voltage/current, data and/or information may be transmitted to and/or received from these elements or components.

Operational systems such as building systems (e.g., heating, ventilation, and air conditioning (HVAC) systems, building automation systems, security systems) and/or industrial systems (e.g., manufacturing systems, sorting and distribution systems) are configured, in some examples, to monitor and/or control various physical aspects of a premises, building, site, location, environment, mechanical system, industrial plant or process, laboratory, manufacturing plant or process, vehicle, utility plant or process, and/or the like. An operational system comprises various assets, including, in some examples, equipment (e.g., controllers, sensors, actuators) configured to perform the functionality attributed to the operational system and/or components, devices, and/or subsystems of the operational system. In some examples, the operational system, via its various assets, may monitor and/or control operation of a residential or commercial building or premises (e.g., HVAC systems, security systems, building automation systems, and/or the like). In other examples, the operational system may monitor and/or control operation of a manufacturing plant (e.g., manufacturing machinery, conveyor belts, and/or the like). In yet other examples, the operational system may monitor and/or control operation of a vehicle.

Often, a given enterprise may be responsible for the management of several operational systems, across several sites and locations, each comprising several (e.g., possibly thousands) of assets. Management of such systems often includes monitoring conditions and/or performance of the systems' assets, facilitating and/or performing service on or physical maintenance of the assets, and/or controlling the assets in order to optimize the assets' and systems' performance and/or fulfill other objectives of the enterprise.

Enterprise performance management (EPM) systems have been proposed to monitor and maintain operational systems. For example, in some operational systems, it has been proposed to communicatively connect operational system(s), including assets of the operational system(s), to a remote monitoring system (e.g., a cloud platform) configured to aggregate operational data with respect to some or all of the assets of one or more operational systems (e.g., deployed at one or more sites or locations). This operational data may comprise sensor data (e.g., generated via assets such as sensors of the operational system) or any other data generated with respect to and/or describing operation of the operational systems and/or assets thereof. The monitoring system may also aggregate and/or maintain operational system context data defining various attributes (e.g., relationships, types, locations, roles) associated with the assets of the operational system and other objects associated with the operational system. This operational data and operational system context data may be collected, archived, and consulted in order to provide visibility into and perform various control operations with respect to the operational system(s), for example. These monitoring systems may be configured to provide, for each enterprise, an enterprise-wide, top-to-bottom, historical and/or real-time, view of the status of various processes, assets, people, and/or other objects associated with all of the operational system(s) managed by the enterprise. The monitoring systems may be configured to generate and present insights (e.g., predictions and/or recommendations) for optimizing performance of the operational system(s) and assets thereof. These insights are often generated using machine learning models, which may be developed, configured, and/or trained using one or more machine learning algorithms.

It has been proposed for some of these EPM systems to utilize graph database technology in order to represent operational systems and any objects related to such systems. A graph database uses graph structures, including data objects forming nodes and edges, each node representing an object relevant to an operational system and each edge defining a relationship between a pair of nodes. In such structures, properties may be defined for nodes and/or edges.

More particularly, operational system context data maintained by an EPM system may comprise an extensible object model and/or an extensible graph-based object model associated with each of the operational system(s). This extensible object model may comprise knowledge graphs that model assets and/or processes of and/or associated with the operational system(s). In one example, knowledge graphs of the operational system context data may define a collection of nodes and links that describe or represent real-world connections between the operational system(s) and/or assets thereof. A knowledge graph of the operational system context data may describe real-world entities (e.g., assets) and their interrelations organized in a graphical interface, may define possible classes and relations of entities or objects associated with the operational system(s) in a schema, may enable interrelating arbitrary entities or objects with each other, and/or may cover various topical domains associated with the operational system(s). Knowledge graphs of the operational system context data may define large networks of entities (e.g., assets), semantic types of the entities, properties of the entities, and relationships between the entities. The knowledge graphs of the operational system context data may describe a network of objects that are relevant to a specific domain or to an enterprise. The extensible object models are not limited to abstract concepts and relation but can also contain instances of objects, such as, for example, documents and datasets. In some embodiments, the knowledge graphs of the operational system context data may include resource description framework (RDF) graphs. As used herein, a "RDF graph" is a graph data model that formally describes the semantics, or meaning, of information. The RDF graph also represents metadata (e.g., data that describes data). According to various embodiments, extensible object models may also include a semantic object model, which may be a subset of a knowledge graph that defines semantics for the extensible object model. For example, a semantic object model may define a schema for an extensible object model.

One advantage provided by the use of extensible object models to represent operational systems is the ability to extend any aspect of a given model by simply adding new nodes representing new objects and/or new edges representing new relationships between the various objects. For example, a different type of extensible object model can be defined for each of a series of different types of operational systems, with each model type comprising a generic set of predefined, classes, objects, nodes, edges, and/or relationships. At the same time, each of these different types can be built upon and extended in different ways with respect to particular operational systems and/or particular enterprises to suit the different needs associated with the particular systems and/or enterprises.

A system for tracking changes to these extensible object models in a manner particularly suited to the monitoring and maintenance of operational systems would be desirable. For example, an EPM system that maintains an extensible object model may comprise one or more data pipelines that may denormalize configuration data from the object model, the configuration data defining functionality of the EPM system or related systems and/or sub-systems with respect to the extensible object models and/or any objects represented therein (e.g., how messages generated with respect to objects represented in the object model are processed in a pipeline). In one exemplary instance, the EPM system may be configured to normalize and enrich sensor data collected from one or more sensors and/or assets of an operational system based on the denormalized configuration data obtained from the object model. Any changes to the configuration data defined in the extensible object model may necessitate updates to corresponding configuration data that had previously been obtained and/or denormalized from the extensible object model. However, reprocessing data through these pipelines is typically costly, making it inexpedient to simply reprocess the required data in response to every change to the object model. Instead, a more customizable and granular solution to tracking changes to extensible object models would be desirable. At the same time, extensible object models used in certain domains (e.g., life sciences) require maintenance of a complete audit trail or log indicating any changes to an object model, and the ability to recover an extensible object model based on a record of all changes made to an object model would be further desirable.

Examples of the present disclosure concern an extensible object model system that provides tracking of any changes made to an extensible object model representing an operational system. In response to detecting changes to the object model, the extensible object model system may generate notifications based on customized or user-configured notification criteria and transmit these notifications to one or more processes of an enterprise management system, allowing the enterprise management system to respond to such changes selectively and/or at the level of publish events generated by the processes of the enterprise management system and incorporating one or more transactions for committing changes to the extensible object model, each of the transactions comprising one or more discrete changes to the extensible object model. All changes to an extensible object model may be stored in a database (e.g., document database), including a delta between a previous instance of the model and the changed instance of the model (e.g., previous and new property values). These notifications and stored changes may be associated with and/or organized based on the publish events generated by the enterprise management system, providing a more useful context for the changes and notifications at the level of the enterprise management system and its various processes and operations. The stored changes can be requested directly as needed and can also be used for both an audit trail and for recovery of an object model.

FIG. 1 illustrates an exemplary block diagram of an environment 100 in which embodiments of the present disclosure may operate. Specifically, FIG. 1 illustrates one or more operational systems 110, an extensible object model system 140, an enterprise management system 120, one or more data repositories 150, and one or more user devices 160, all connected to a network 130.

The network 130 may be embodied in any of a myriad of network configurations. In some embodiments, the network 130 may be a public network (e.g., the Internet). In some embodiments, the network 130 may be a private network (e.g., an internal localized, or closed-off network between particular devices). In some other embodiments, the network 130 may be a hybrid network (e.g., a network enabling internal communications between particular connected devices and external communications with other devices). In various embodiments, the network 130 may include one or more base station(s), relay(s), router(s), switch(es), cell tower(s), communications cable(s), routing station(s), and/or the like. In various embodiments, components of the environment 100 may be communicatively coupled to transmit data to and/or receive data from one another over the network 130. Such configuration(s) include, without limitation, a wired or wireless Personal Area Network (PAN), Local Area Network (LAN), Metropolitan Area Network (MAN), Wide Area Network (WAN), and/or the like.

The one or more data repositories 150 may be configured to receive, store, and/or transmit data. In some embodiments, the one or more data repositories 150 store operational data collected from and/or associated with the one or more operational systems 110, operational system context data associated with the one or more operational systems 110, including possibly one or more extensible object models (e.g., each representing one of the one or more operational systems 110), change events generated by the extensible object model system 140 with respect to the one or more extensible object models, publish events generated by the enterprise management system 120 with respect to the one or more extensible object models, and/or notification criteria for generating change notifications with respect to the one or more extensible object models, to list a few examples.

The one or more user devices 160 may be associated with users of the enterprise management system 110, the extensible object model system 140, and/or the operational system(s) 110. In various embodiments, the enterprise management system 120 may cause data associated with the one or more operational systems 110 (e.g., including operational data collected from and/or associated with the operational systems 110, data generated via the extensible object model system 140, and/or some or all of the model data forming the one or more extensible object models) to be transmitted to and/or displayed on the user device(s) 160. The extensible object model system 140 may cause data and/or interfaces associated with configuration, maintenance, and/or utilization of the one or more extensible object models to be transmitted to and/or displayed on the user device(s) 160.

Each of the one or more operational systems 110 may be configured to monitor and/or control various physical aspects of a premises, building, site, location, environment, mechanical system, industrial plant or process, laboratory, manufacturing plant or process, vehicle, and/or utility plant or process, to name a few examples, via one or more assets of the one or more operational systems 110. The assets may be physical components (e.g., implemented at least via hardware) installed, positioned, and/or deployed throughout the operational system(s) 110, including controllers, sensors, and/or actuators of various types, to list a few examples. The assets may include computing devices for executing instructions (e.g., stored in nonvolatile memory) for performing various functions of the operational system(s) 110, for example, by receiving sensor data from one or more sensors and controlling one or more actuators (e.g., based on the received sensor data). The assets may include field controllers of the operational system. In an example context, at least some of the assets of the operational system(s) 110 may each embody a computing device of one or more systems for operation of a residential building (e.g., HVAC (heating, ventilation, and air conditioning) assets, security assets, and/or the like) such as controllers for directing the functionality of actuators such as air handlers, blowers, condensers, chillers, and/or dampers, to list a few examples. In another example context, at least some of the assets of the operational system(s) 110 may each embody a computing device of one or more systems for operation of a manufacturing plant (e.g., HVAC assets, manufacturing machinery, conveyor belts, and/or the like) such as controllers for directing the functionality of actuators such as the manufacturing machinery and/or conveyor belts. Actuators of the one or more operational systems 110 may be activated and/or controlled to perform various physical operations of the operational system 110.

Sensors of the one or more operational system 110 may be configured to generate sensor data based on incorporated sensing elements and may include digital sensors, which generate and transmit digital sensor data based on conditions sensed by sensing elements of the sensors, and/or analog sensors, which produce analog signals based on conditions sensed by sensing elements of the sensors. The sensors may be configured to read and/or otherwise capture certain values associated with a premises, building, site, location, environment, mechanical system, industrial plant or process, laboratory, manufacturing plant or process, and/or utility plant or process, or operations associated therewith or therein.

During configuration, operation, and/or maintenance of the one or more operational systems 110, operational data associated with the one or more operational systems 110 may be generated. In one example, during periods of operation of the operational system(s) 110, assets of the operational system(s) 110 may generate operational data based on and/or indicative of said operation, including sensor data, operational status data, operating conditions data, and/or operation logs (e.g., indicating operations performed by the system or assets thereof), to list a few examples. In another example, during configuration of the operational system(s), assets of the operational system(s) 110 may generate and/or receive system and/or asset configuration data of the operational data. In yet another example, other types of operational data may be generated (e.g., by the operational system(s) and/or external systems for managing the operational system(s) and/or an enterprise associated therewith), including operational system maintenance data based on and/or indicative of maintenance and/or service operations performed with respect to the operational system(s) 110 and/or operational system performance data based on and/or indicative of performance of the operational system(s) 110 with respect to one or more objectives of the enterprise.

Additionally or alternatively, operational system context data may be generated with respect to the one or more operational systems 110, including the one or more extensible object models. In one example, the enterprise management system 120 may be configured to manage and/or maintain the one or more operational systems 110, including receiving, retrieving, and/or aggregating data associated with the operational systems(s) 110 and generating the operational system context data and/or the extensible object model(s) based on the received, retrieved, and/or aggregated data.

In some examples, the operational system context data associated with an operational system 110 may comprise an extensible object model associated with the operational system 110, as previously defined. The operational system context data and/or extensible object model associated with a given operational system may comprise metadata associated with various components and/or assets of the given operational system, for example, defining various attributes and/or characteristics of the assets and/or associations or relationships between the various assets. In one example, the operational system context data and/or extensible object model for an operational system may comprise an ontology model providing a representation of each of the various assets of the operational system, classification of the assets into various groups or categories, definition of various attributes of the assets and/or categories, and/or definition of associations between the various objects and/or categories referenced throughout the operational system context data.

The operational system context data and/or extensible object model(s) may include identification information for individual assets of the operational system, type information for the individual assets assigning types to each of the assets, properties associated with the identification information and/or the type information, locations of the assets within the operational system and/or an environment where the operational system is installed, functional and/or physical locations of the assets with respect to each other, relationships between the assets with respect to each other, relationships between types of the assets with respect to each other, and/or roles of the assets and/or types of assets within the operational system and/or within subsystems of the operational system, to name a few examples. The operational system context data and/or extensible object model(s) associated with a given operational system may comprise data and/or metadata associated with any objects associated with the given operational system, which objects may include assets and/or equipment of the one or more operational systems 110, sensors included in and/or associated with the one or more operational systems 110, alarms or alarm tasks associated with the one or more operational systems 110 (e.g., concerning required or recommended maintenance, anomalies, unsafe operating conditions), sites, locations, or regions containing the one or more operational systems 110 and/or any assets thereof, and/or individuals associated with the one or more operational systems 110, to name a few examples.

The operational system context data and/or extensible object model associated with a given operational system may comprise data and/or metadata defining objects representing management, maintenance, and/or service tasks associated with various assets of the operational systems, including, for example, alarms associated with certain assets or types of assets and representing configuration settings for generating alarm notifications concerning the need for certain maintenance operations associated with the assets or asset types.

The operational data and/or operational system context data (e.g., including the one or more extensible object models) associated with the one or more operational systems 110 may be aggregated and/or stored in the one or more data repositories 150 and/or may be accessible by the extensible object model system 140 and/or the enterprise management system 120.

The extensible object model system 140 may be a computing system or device (e.g., server system) configured via hardware, software, firmware, and/or a combination thereof, to generate, configure, modify, access, utilize, and/or manage the one or more extensible object models associated with the one or more operational systems 110.

More particularly, the extensible object model system 140 may be configured to present and/or expose one or more model transaction interfaces, receive (e.g., via the model transaction interface(s)) and process model transactions generated by the enterprise management system 120 in connection with the extensible object model(s), to generate, configure, modify, commit changes to, and/or retrieve model data from the extensible object model(s) (e.g., based on the received and processed model transactions), and/or to transmit model data from the extensible object model(s) to the enterprise management system 120.

The extensible object model system 140 may be configured to detect changes to the extensible object model(s) representing the operational system(s) 110, generate change events representing the detected changes (e.g., in response to detecting the changes and/or based at least in part on the detected changes), store the change events in the one or more data repositories 150, transmit the change events to the enterprise management system 120, and/or cause the enterprise management system to perform one or more monitoring and control operations with respect to the operational system(s) based at least in part on the change events. The extensible object model system 140 may be configured to receive (e.g., from the enterprise management system 120) one or more publish events associated with the detected changes and/or to generate the change events based at least in part on the received publish event(s).

In some embodiments, the extensible object model system 140 may be configured to present and/or expose one or more change event interfaces, receive via the change event interface(s) change event requests (e.g., from the enterprise management system 120 and/or user device(s) 160), and/or transmit one or more change events to the enterprise management system 120 (e.g., in response to receiving the change event requests and/or based at least in part on the change event requests).

Moreover, in some embodiments, the extensible object model system 140 may be configured to generate change notifications based at least in part on the change events and/or configurable notification criteria, transmit the change notifications to the enterprise management system, and/or cause the enterprise management system 120 to perform the one or more monitoring and control operations with respect to the operational system(s) 110 based at least in part on the change notifications. More particularly, generating the change notifications by the extensible object model system 140 may comprise generating at least one change notification corresponding to a change event in response to determining that all changes to an extensible object model indicated in the change event (and/or corresponding to a publish event associated with the changes and/or the change event) are complete.

In some embodiments, the extensible object model system 140 may be configured to generate one or more change audit reports and/or recovered extensible object models based at least in part on the change events.

In some embodiments, the extensible object model system 140 may be configured to cause the enterprise management system 120 to generate updated operational data processing criteria based at least in part on the change events.

The enterprise management system 120 may be or comprise an EPM system (as previously defined and described) and/or a computing system or device (e.g., server system) configured via hardware, software, firmware, and/or a combination thereof, to perform various operations with respect to the operational system(s) 110 and/or the extensible object model(s). For example, the enterprise management system 120 may be configured to generate model transactions with respect to the one or more extensible object models associated with the operational system(s) 110, transmit the model transactions to the extensible object model system 140, generate publish events associated with the model transactions, each publish event, for example, indicating one or more model transactions and/or one or more changes effected (e.g., via the model transactions) with respect to the one or more extensible object models, and/or transmit the publish events to the extensible object model system 140. In another example, the enterprise management system 120 may be configured to receive, present, and/or process change notifications from the extensible object model system 140 and/or to perform one or more monitoring and control operations with respect to the operational system(s) 110 based at least in part on the change notifications. In yet another example, the enterprise management system 120 may be configured to generate change event requests, transmit the change event requests to the extensible object model system 140, to receive, present, and/or process change events received from the extensible object model system (e.g., in response to the change event requests), and/or to perform one or more monitoring and control operations with respect to the operational system(s) 110 based at least in part on the change events.

The enterprise management system 120 may be configured to present and/or process any output data resulting from operations performed by the extensible object model system 140 and/or the operational system(s) 110, including, for example, presenting one or more monitoring, control, and/or insight interfaces within a graphical user interface (GUI) rendered on one or more displays of one or more of the user devices 160. The one or more interfaces may comprise one or more graphical elements for displaying the output data (e.g., including data resulting from processing the output data) and/or one or more interactable elements for receiving presentation and/or analysis input, for example, as user input. The presentation and/or analysis input may represent one or more selections of presentation parameters for determining how the output data is displayed and/or one or more selections of analysis parameters for determining how the output data is processed, to name a few examples. The output data presented and/or processed by the enterprise management system 120 may include model data from the extensible object model(s) (e.g., representing some or all of a given extensible object model), change notifications, change events, change audit reports, and/or operational data, to list a few examples.

While FIG. 1 illustrates certain components as separate, standalone entities communicating over the network 130, various embodiments are not limited to this configuration. In other embodiments, one or more components may be directly connected and/or share hardware or the like.

FIG. 2 illustrates an exemplary block diagram of an example apparatus that may be specially configured in accordance with an example embodiment of the present disclosure. Specifically, FIG. 2 depicts an example computing apparatus 200 ("apparatus 200") specially configured in accordance with at least some example embodiments of the present disclosure. Examples of an apparatus 200 may include, but is not limited to, one or more components of one or more operational systems 110, an extensible object model system 140, an enterprise management system 120, data repositories 150, and/or user devices 160. The apparatus 200 includes processor 202, memory 204, input/output circuitry 206, communications circuitry 208, and/or change event circuitry 210, data intake circuitry 212, notification circuitry 214, recovery circuitry 216, and/or audit report circuitry 218. In some embodiments, the apparatus 200 is configured to execute and perform the operations described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), memory(ies), circuitry(ies), and/or the like to perform their associated functions such that duplicate hardware is not required for each set of circuitry.

In various embodiments, a device, system, or apparatus, such as apparatus 200 of one or more components of one or more operational systems 110, an extensible object model system 140, an enterprise management system 120, data repositories 150, and/or user devices 160, may refer to, for example, one or more computers, computing entities, desktop computers, mobile phones, tablets, phablets, notebooks, laptops, distributed systems, servers, or the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein. In one embodiment, these functions, operations, and/or processes can be performed on data, content, information, and/or similar terms used herein. In this regard, the apparatus 200 embodies a particular, specially configured computing entity transformed to enable the specific operations described herein and provide the specific advantages associated therewith, as described herein.

Processor 202 or processor circuitry 202 may be embodied in a number of different ways. In various embodiments, the use of the terms "processor" should be understood to include a single core processor, a multi-core processor, multiple processors internal to the apparatus 200, and/or one or more remote or "cloud" processor(s) external to the apparatus 200. In some example embodiments, processor 202 may include one or more processing devices configured to perform independently. Alternatively, or additionally, processor 202 may include one or more processor(s) configured in tandem via a bus to enable independent execution of operations, instructions, pipelining, and/or multithreading.

In an example embodiment, the processor 202 may be configured to execute instructions stored in the memory 204 or otherwise accessible to the processor. Alternatively, or additionally, the processor 202 may be configured to execute hard-coded functionality. As such, whether configured by hardware or software methods, or by a combination thereof, processor 202 may represent an entity (e.g., physically embodied in circuitry) capable of performing operations according to embodiments of the present disclosure while configured accordingly. Alternatively, or additionally, processor 202 may be embodied as an executor of software instructions, and the instructions may specifically configure the processor 202 to perform the various algorithms embodied in one or more operations described herein when such instructions are executed. In some embodiments, the processor 202 includes hardware, software, firmware, and/or a combination thereof that performs one or more operations described herein.

In some embodiments, the processor 202 (and/or co-processor or any other processing circuitry assisting or otherwise associated with the processor) is/are in communication with the memory 204 via a bus for passing information among components of the apparatus 200.

Memory 204 or memory circuitry embodying the memory 204 may be non-transitory and may include, for example, one or more volatile and/or non-volatile memories. In some embodiments, the memory 204 includes or embodies an electronic storage device (e.g., a computer readable storage medium). In some embodiments, the memory 204 is configured to store information, data, content, applications, instructions, or the like, for enabling an apparatus 200 to carry out various operations and/or functions in accordance with example embodiments of the present disclosure.

Input/output circuitry 206 may be included in the apparatus 200. In some embodiments, input/output circuitry 206 may provide output to the user and/or receive input from a user. The input/output circuitry 206 may be in communication with the processor 202 to provide such functionality. The input/output circuitry 206 may comprise one or more user interface(s). In some embodiments, a user interface may include a display that comprises the interface(s) rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms. The processor 202 and/or input/output circuitry 206 comprising the processor may be configured to control one or more operations and/or functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a computing device and/or other display associated with a user.

Communications circuitry 208 may be included in the apparatus 200. The communications circuitry 208 may include any means such as a device or circuitry embodied in either hardware or a combination of hardware and software that is configured to receive and/or transmit data from/to a network and/or any other device, circuitry, or module in communication with the apparatus 200. In some embodiments the communications circuitry 208 includes, for example, a network interface for enabling communications with a wired or wireless communications network. Additionally or alternatively, the communications circuitry 208 may include one or more network interface card(s), antenna(s), bus(es), switch(es), router(s), modem(s), and supporting hardware, firmware, and/or software, or any other device suitable for enabling communications via one or more communications network(s). In some embodiments, the communications circuitry 208 may include circuitry for interacting with an antenna(s) and/or other hardware or software to cause transmission of signals via the antenna(s) and/or to handle receipt of signals received via the antenna(s). In some embodiments, the communications circuitry 208 enables transmission to and/or receipt of data from a user device and/or other external computing device(s) in communication with the apparatus 200.

Data intake circuitry 212 may be included in the apparatus 200 (e.g., an apparatus specifically corresponding to the enterprise management system 120). The data intake circuitry 212 may include hardware, software, firmware, and/or a combination thereof, designed and/or configured to capture, receive, request, and/or otherwise gather data associated with operations of the one or more operational systems 110, including the operational data associated with the one or more operational systems 110. The data intake circuitry 212 may include hardware, software, firmware, and/or a combination thereof, designed and/or configured to capture, receive, request, and/or otherwise gather data associated with configuration of the one or more operational systems 110, including the operational system context data associated with the one or more operational systems 110. In some embodiments, the data intake circuitry 212 includes hardware, software, firmware, and/or a combination thereof, that communicates with one or more controller(s), device(s), component(s), unit(s), and/or the like within a particular operational system to receive particular data associated with such operations of the operational system. In some embodiments, the data intake circuitry 212 includes hardware, software, firmware, and/or a combination thereof, that communicates with an enterprise management system 120 to receive particular data associated with configuration of the operational system. The data intake circuitry 212 may support such operations for any number of individual operational systems associated with any number of enterprises. Additionally or alternatively, in some embodiments, the data intake circuitry 212 includes hardware, software, firmware, and/or a combination thereof, that retrieves particular data associated with one mor more operational system(s) from one or more data repository/repositories accessible to the apparatus 200.

Change event circuitry 210 may be included in the apparatus 200 (e.g., an apparatus specifically corresponding to the extensible object model system 140). The change event circuitry 210 may include hardware, software, firmware, and/or a combination thereof, designed and/or configured to request, receive, process, generate, and transmit data, data structures, control signals, and electronic information for generating, storing, retrieving, and/or transmitting change events and/or change event requests, including performing any of the operations described herein with respect to change events and/or change event requests.

Notification circuitry 214 may be included in the apparatus 200 (e.g., an apparatus specifically corresponding to the extensible object model system 140). The notification circuitry 214 may include hardware, software, firmware, and/or a combination thereof, designed and/or configured to request, receive, process, generate, and transmit data, data structures, control signals, and electronic information for generating and/or transmitting change notifications, including performing any of the operations described herein with respect to change notifications.

Recovery circuitry 216 may be included in the apparatus 200 (e.g., an apparatus specifically corresponding to the extensible object model system 140). The recovery circuitry 216 may include hardware, software, firmware, and/or a combination thereof, designed and/or configured to request, receive, process, generate, and transmit data, data structures, control signals, and electronic information for generating and/or storing recovered extensible object models, including performing any of the operations described herein with respect to recovered extensible object models.

Audit report circuitry 218 may be included in the apparatus 200 (e.g., an apparatus specifically corresponding to the extensible object model system 140). The audit report circuitry 218 may include hardware, software, firmware, and/or a combination thereof, designed and/or configured to request, receive, process, generate, and transmit data, data structures, control signals, and electronic information for generating, storing, transmitting, and/or presenting change audit reports, including any of the operations described herein with respect to change audit reports.

In some embodiments, two or more of the sets of circuitries 202-218 are combinable. Alternatively, or additionally, one or more of the sets of circuitry 202-218 perform some or all of the operations and/or functionality described herein as being associated with another circuitry. In some embodiments, two or more of the sets of circuitry 202-218 are combined into a single module embodied in hardware, software, firmware, and/or a combination thereof. For example, in some embodiments, one or more of the sets of circuitry, for example the change event circuitry 210, may be combined with the processor 202, such that the processor 202 performs one or more of the operations described herein with respect the change event circuitry 210.

FIG. 3 is an illustration of an example extensible object model system 140, in accordance with at least some example embodiments of the present disclosure. Specifically, FIG. 3 includes schematic depictions of the example extensible object model system 140, including example internal processes and components of the extensible object model system 140, and/or schematic depictions of the one or more data repositories 150, the enterprise management system 120, and the operational system(s) 110 in communication with the extensible object model system 140, along with example data objects used by and/or produced by the depicted processes, components, and/or systems. The extensible object model system 140 and/or apparatuses 200 associated therewith, for example, may be specially configured via hardware, software, firmware, and/or a combination thereof, to perform the various data processing and interactions described with respect to FIG. 3 to process, commit, and detect changes (e.g., via model transactions) with respect to the extensible object model(s), generate, store, and transmit change requests, generate and transmit change notifications, generate change audit reports, and/or generate recovered extensible object models.

In the illustrated example, the extensible object model system 140 comprises, in some examples, a transaction event handling service 302, one or more model transaction interfaces 304, a change event generation process 314, a notification service 322, a change event request service 328, one or more change event interfaces 330, an audit report service 334, and a recovery service 338. Additionally, in the illustrated example, the one or more data repositories 150 comprise, in some examples, a graph database 308 and a document database 320.

In various embodiments, the transaction event handling service 302 of the extensible object model system 140 may be configured to perform and/or facilitate creation, configuration, modification, access, and/or retrieval of the extensible object model(s) associated with and/or representing the operational system(s) 110. In some embodiments, the transaction event handling service 302 may be configured to present one or more model transaction interfaces 304 for receiving model transactions 306 (e.g., from the enterprise management system 120) associated with the extensible object model(s). For example, the transaction event handling services 302 may be configured to present the model transaction interface(s) 304 within a graphical user interface (GUI) rendered on one or more displays of one or more of the user devices 160, including presenting the model data 310 representing a portion of or all of some or all of the extensible object model(s) within the GUI. In another example, the transaction event handling service 302 may be configured to present the model transaction interface(s) 304 by exposing an application programming interface (API) configured to receive the model transactions 306 and to return the model data 310 in response to and/or based on the received model transactions 306 or a subset thereof.

The graph database 308 may be a graph database as previously defined and described (e.g., structuring stored data as objects that form nodes and edges, each node representing an object relevant to an operational system and each edge defining a relationship between a pair of nodes). The graph database 308 may be configured to store the extensible object model(s) associated with and/or representing the operational system(s) 110 and/or may be associated with the extensible object model system 140 and/or the enterprise management system 120. In one example, some or all of the graph database 308 may be embodied in one or more graph database products and/or services (e.g., cloud-based graph database platforms) such as the Neo4j Graph Database product(s) and/or Neo4j AuraDB service(s) produced by Neo4j, Inc.

The model transactions 306 may be (e.g., structured) data objects representing changes to the extensible object model(s) and/or requests for data from the extensible object model(s), including creating or deleting an extensible object model, adding data to and/or deleting data from an extensible object model, and/or retrieving an extensible object model or a portion thereof (e.g., based on query parameters included in the transactions). Each of the model transactions 306 may comprise one or more queries to be executed by the graph database 308 with respect to a selected one of the extensible object model(s). Each of the one or more queries may represent an operation to be performed with respect to the extensible object model (e.g., adding a new model, deleting an existing model, adding data to an existing model, deleting data from an existing model, retrieving data from an existing model), the operation being defined and/or expressed, for example, in a query language associated with the graph database 308 (e.g., Cypher).

The transaction event handling service 302 may be configured to receive (e.g., via the model transaction interface(s) 304) model transactions 306 generated and sent by the enterprise management system 120 to be committed to the extensible object model and/or to the graph database 308. In response to receiving the model transactions 306, the transaction event handling service 302 may be configured to commit the received model transactions 306. The transaction event handling service 302 may commit the received model transactions 306 by retrieving model data 310 from the extensible object model(s) stored in the graph database 308 based at least in part on the committed model transactions 306 (e.g., as defined in the queries comprised by the model transactions 306 or based on parameters included in the queries comprised by the model transactions 306). The transaction event handling service 302 may transmit the model data 310 received from the graph database 308 in response to the committed model transactions 306 to the enterprise management system 120, which may be configured to present the model data 310, process and/or analyze the model data 310, and/or perform one or more monitoring/control operations 342 with respect to the operational system(s) 110 based at least in part on the model data 310.

The model data 310 may comprise any data obtained from the extensible object model(s), including data objects representing nodes, relationships, and/or paths, and/or any attributes or properties thereof, defined in the extensible object model. The nodes, relationships, and/or paths represented by the data objects included in the model data 310 may be those that were determined to match one or more query or search parameters defined in the queries comprised by the model transactions 306. The model data 310 may represent a portion of the extensible object model or the entirety of the extensible object model.

The transaction event handling service 302 may commit the received model transactions 306 by sending, executing, and/or causing execution of one or more model changes 312 to the extensible object model(s) stored in the graph database 308 based at least in part on the committed model transactions 306 (e.g., as defined in the queries comprised by the model transactions 306). Upon execution of the model changes 312, any changes to the extensible object model(s) effected by the execution of the model changes 312 and/or by the committed model transactions 306 are persisted in the graph database 308 and/or are made available or visible to other transactions and/or other processes and/or systems having access to the graph database 308. The model changes 312 may comprise any modification operation, including, for example, adding a new model, deleting an existing model, adding data to an existing model, and/or deleting data from an existing model.

The change event generation process 314 may be configured to detect changes to the extensible object model(s) stored in the graph database 308. For example, the change event generation process 314 may be in communication with the transaction event handling service 302 such that the change event generation process 314 is capable of identifying changes to the extensible object model(s) effected by the model transactions 306 committed to the graph database 308 by the transaction event handling service 302 as well as extracting data identifying, defining, and/or characterizing the effected changes, including data identifying which new extensible object model was created and added to the graph database 308, which existing extensible object model was deleted from the graph database 308, which extensible object model was modified, which new objects (e.g., nodes, relationships) were added to the extensible object model, which existing objects (e.g., nodes, relationships) were deleted from the extensible object model, which objects (e.g., nodes, relationships) of the extensible object model were modified, which properties of the modified objects were changed, previous values of the changed properties, and/or updated values of the changed properties, to list a few examples.

The change event generation process 314 may be configured to generate change events 318 based at least in part on the detected changes. In some embodiments, each of the change events 318 may comprise a change event identifier and change data characterizing one or more changes, of the detected changes, associated with a particular extensible object model of the one or more extensible object models, including one or more one changed attributes of the particular extensible object model, a previous value of each of the one or more changed attributes, and a changed value of each of the one or more changed attributes. For example, the change event generation process 314 may be configured to include in the generated change events 318 any or all of the data extracted by the change event generation process 314 (as described above) with respect to the detected changes along with data identifying a particular extensible object model to which the changes were applied.

In various embodiments, in the course of normal operation (e.g., performing monitoring/control operations 342 with respect to the operational system(s) 110), the enterprise management system 120 may be configured to generate various changes to the extensible object model(s) stored in the graph database 308. Initially, these changes may be generated and retained locally (rather than executed or committed to the extensible object model(s)), and groups of such changes may be associated with particular operations being performed by the enterprise management system 120.

For example, the enterprise management system 120, in conjunction with one or more of the user devices 160 and/or user input, may generate a set of changes associated with an extension operation for a particular extensible object model, the extension operation including the addition of several new nodes and relationships to the object model. Each individual node or relationship adding during the extension operation may correspond to an individual change to the object model (and/or to an individual query representing the individual change). The set of all individual changes (e.g., new nodes and relationships) generated during the course of the extension operation may collectively correspond to the extension operation. During the course of the extension operation, the enterprise management system 120 may be configured to generate one or more model transactions 306 for committing and/or persisting these changes to the particular extensible object model stored in the graph database 308 and to group the individual changes into one or more sets of changes, with each set being associated with and included in a model transaction 306 generated by the enterprise management system. The grouping of individual changes into sets and the generation of model transactions 306 for each set may be performed gradually over the course of the extension operation, with a first set of individual changes being generated and then included in a first model transaction 306 that is then transmitted to the extensible object model system 140, after which additional individual changes and model transactions 306 may be generated in connection with the same extension operation as the first set of individual changes.

Although some sets of the individual changes associated with the extension operation may be committed (and thus made available to other processes and/or systems having access to the graph database 308) before the conclusion of the entire extension operation, the functionality of some processes (e.g., of the enterprise management system 120) and/or systems having access to the graph database 308 may depend upon the entirety of the extension operation being performed and concluded rather than just the portions of the extension operation represented by the individual changes and/or the model transactions 306 that have been committed thus far. Accordingly, the enterprise management system 120 may be configured to generate publish events 316 in connection with performing an operation (such as the exemplary extension operation described above), with each of the publish events 316 corresponding to a particular operation (such as the extension operation). These publish events 316 may be associated with one or more model transactions 306, namely the set of transactions that were generated and committed during the course of the particular operation. For example, with respect to the example extension operation scenario discussed above, upon generating all of the individual changes associated with the extension operation and upon generating and transmitting all of the model transactions 306 associated with the extension operation, the enterprise management system 120 may be configured to generate a publish event 316 specifically associated with the extension operation and associated with the set of all individual changes and all model transactions 306 generated during the extension operation.

Each of the publish events 316 may comprise data identifying and/or characterizing a particular operation (e.g., the extension operation) as well as data identifying all of the model transactions 306 that were generated and committed during the course of the particular operation. The enterprise management system 120 may transmit the publish events 316 to the extensible object model system 140, allowing the extensible object model system 140 to perform customizable functionality with respect to not just individual changes or individual model transactions 306 but with respect to particular operations performed by the enterprise management system 120 (e.g., at the application level).

In some embodiments, the change event generation process 314 may be configured to receive the publish events 316 from the enterprise management system 120 and to generate the change events 318 based at least in part on and/or in response to the publish events 316. In one example, the change event generation process 314 may be configured to, in response to receiving a particular publish event 316, generate a particular change event 318 specifically associated with the particular publish event 316 and to include in the generated change event 318 an indication of all of the detected changes and corresponding extracted data characterizing the detected changes (as described above). The change event generation process 314 may determine from the publish event 316 a set of one or more model transactions 306 associated with the publish event 316 and to include in the generated change event 318 all of the detected changes and corresponding extracted data characterizing the detected changes that are associated with each of the model transactions 306 determined from the publish event 316. In this way, the change events 318 may organize the detected changes in terms of operations performed (e.g., at the application level) by the enterprise management system 120. Moreover, the change event generation process 314 may be configured to include in the generated change events 318 data identifying a particular extensible object model to which the changes were applied, data identifying a corresponding publish event 316 associated with the changes, and/or data identifying and/or characterizing a particular operation (performed by the enterprise management system 120) with which the changes are associated (e.g., the particular operation that generated the changes), to list a few examples.

The change event generation process 314 may be configured to store the change events 318 in the document database 320 of the one or more data repositories 150. The document database 320 may be a document-oriented database or document store configured to store semi-structured data, which may be encapsulated and/or encoded in a predetermined standard format or encoding associated with the document database 320 such as a file or data interchange format (e.g., JavaScript Object Notation (JSON)). Accordingly, the change event generation process 314 may be configured to generate the change events 318 such that each change event 318 is defined as a discrete object defined in the associated file or data interchange format (e.g., JSON) before storing the change events 318 to the document database 320.

The change events 318 generated by the change event generation process 314 may be transmitted to (or otherwise made available to) the notification service 322.

The notification service 322 may be configured to generate change notifications based at least in part on the change events 318 generated by the change event generation process 314, to transmit the change notifications to the enterprise management system 120, and to cause the enterprise management system 120 to perform monitoring/control operation(s) 342 with respect to the operational system(s) based at least in part on the change notifications 326.

The change notifications 326 may comprise data identifying a particular extensible object model that has been changed, data identifying a particular change event 318 (e.g., a change event identifier) associated with the change notification 326, and/or data identifying a notification type, change event type, publish event type, and/or operation type (e.g., of an operation performed by the enterprise management system 120 that caused the changes).

The notification service 322 may be configured to generate the change notifications 326 based at least in part on configurable notification criteria 324, which may be retrieved from the one or more data repositories 150 and/or otherwise provided to the notification service 322. In some embodiments, the notification service 322 may present one or more configuration interfaces for receiving notification criteria input, may receive the notification criteria input via the configuration interface(s), and may generate the notification criteria 324 based at least in part on the received notification criteria input. The notification service 322 (and/or another process or service of the extensible object model system 140) may be configured to present the notification criteria interface(s) within a GUI rendered on one or more displays of one or more of the user devices 160, including interactable elements for receiving selections of notification criteria. In another example, the notification service 322 (and/or another process or service of the extensible object model system 140) may be configured to present the notification criteria interface(s) by exposing an API configured to receive the notification criteria 324 and/or the notification criteria input.

The notification criteria 324 may define whether and/or how the change notifications 326 are generated and/or transmitted by the notification service 322. For example, the notification criteria 324 may indicate, for one or more change event types of a set of change event types associated with the change events 318, whether one or more change notifications 326 should be generated, destination processes, sub-systems, and/or systems to which the change notifications 326 for that change event type should be transmitted, and/or what data should be included in the change notifications 326 for each change event type. The change event types may correspond to different types of operations performed by the enterprise management system 120, associated with the publish events 316 and/or change events 318, and/or identified within the change events 318.

In one example, in response to receiving a change event 318 of a particular change event type, the notification service 322 may generate one or more change notifications 326 corresponding to the received change event 318 in response to determining that the notification criteria 324 indicates that one or more change notifications 326 should be generated for that particular change event type, may include in each of the one or more change notifications 326 an indication of the particular change event type along with any data indicated by the notification criteria 324 to be included in notifications for the particular change event type, and may transmit each of the one or more change notifications 326 to a particular process or sub-system (e.g., of the enterprise management system 120) as indicated in the notification criteria 324. In another example, in response to receiving a change event 318 of a particular change event type, the notification service 322 may not generate any change notifications 326 in response to determining that the notification criteria 324 indicates that no change notifications 326 should be generated for that particular change event type (or does not include any indication that any change notifications 326 should be generated for that particular change event type).

In this way, the change notifications 326 generated by the notification service 322 allow the behavior of the enterprise management system 120 and its various processes and/or sub-systems with respect to changes made to the extensible object model(s) to be customized according to the completion of an entire set of changes associated with an application-level operation rather than being limited to responding to individual model changes 312 or even individual model transactions 306. Additionally, the notification criteria 324 defining whether and/or how the change notifications 326 are generated allows for customization of the behavior of the enterprise management system 120 and its various processes and/or sub-systems with respect to changes made to the extensible object model(s) according to the specific type of application-level operation (e.g., of the enterprise management system 120) that generated the changes.

In various embodiments, the change event request service 328 of the extensible object model system 140 may be configured to provide change events 318 (e.g., stored in the document database 320) to one or more requesting entities, including, for example, the enterprise management system 120. In some embodiments, the change event request service 328 may be configured to present one or more change event request interfaces 330 for receiving change event requests 322 (e.g., from the enterprise management system 120). For example, the change event request service 328 may be configured to present a change event request interface 330 within a GUI rendered on one or more displays of one or more of the user devices 160, including interactable elements configured to receive input indicative of a selection of an individual change event 318 and/or a set of change events 318, with the change event requests 332 being generated based at least in part on the received input. In another example, the change event request service 328 may be configured to present a change event interface 330 by exposing an API configured to receive the change event requests 332 and to return the requested change event(s) 318 in response to and/or based on the received change event requests 332.

In some embodiments, a change event request 332 may comprise data identifying a particular change event 318 (e.g., a change event identifier assigned to and/or comprised by the particular change event 318). In one exemplary scenario, a process of the enterprise management system 120 may receive a particular change notification 326 comprising a change event identifier indicating a particular change event 318 with which the particular change notification 326 is associated, generate a particular change event request 332 comprising the change event identifier indicated in the particular change notification 326, and transmit the particular change event request 332 to the change event request service 328 (via the change event interface(s) 330). In response to receiving the particular change event request 332, the change event request service 328 may extract the change event identifier included in the particular change event request 332, retrieve the particular change event 318 corresponding to the extracted change event identifier (e.g., from the document database 320), and return the retrieved change event 318 to the process of the enterprise management system 120 that generated the request. The process of the enterprise management system 120 may then perform monitoring/control operation(s) 342 with respect to the operational system(s) 110 based at least in part on the received change event 318 and/or any data included therein, including presenting the data contained in the change event 318 (e.g., via user devices 160), generating further changes to the extensible object model(s) based at least in part on the data contained in the change event 318, generating updated operational data processing criteria based at least in part on the change event 318, and/or sending control data and/or signals to the operational system(s) 110 (and/or assets thereof) based at least in part on the change event 318, to list a few examples.

In some embodiments, a change event request 332 may comprise data indicating parameters for selecting a set of change events 318. The change event request service 328 may be configured to retrieve (e.g., from the document database 320) a set of change events 318 according to the parameters indicated in the change event request 332 (e.g., having properties and/or characteristics matching the indicated parameters) and return the retrieved set of change events 318 to the entity that sent the change event request 332 (e.g., the enterprise management system 120).

The audit report service 334 of the extensible object model system 140 may be configured to generate a change audit report 336 corresponding to a particular extensible object model (e.g., an extensible object model that is under audit and/or associated with an operational system that is under audit) based at least in part on a subset of change events 318 (of those generated and/or stored by the system 140) associated with the particular extensible object model. For example, the subset of change events 318 associated with the particular extensible object model may include some or all of the change events 318 that have been previously generated by the change event generation process 314 for the particular extensible object model. As such, the subset of change events 318 associated with the particular extensible object model may comprise an indication of some or all of the changes (e.g., detected by the change event generation process 314) that have been executed with respect to the particular extensible object model. The audit report service 334 may be configured to generate the change audit report 336 to comprise an indication of an initial state of the particular extensible object model (e.g., corresponding to a default and/or baseline extensible object model associated with the particular extensible object model) along with some or all of the changes detected with respect to the particular extensible object model and/or indicated in the subset of change events 318 associated with the particular extensible object model. The change audit reports 336 may be requested by and/or transmitted to the enterprise management system 120 and/or presented on one or more user devices 160, to name a few examples.

The recovery service 338 of the extensible object model system 140 may be configured to generate a recovered extensible object model 340 corresponding to a particular extensible object model (e.g., an extensible object model determined to be corrupted, lost, and/or damaged) based at least in part on a subset of change events 318 (of those generated and/or stored by the system 140) associated with the particular extensible object model. For example, the subset of change events 318 associated with the particular extensible object model may include some or all of the change events 318 that have been previously generated by the change event generation process 314 for the particular extensible object model. As such, the subset of change events 318 associated with the particular extensible object model may comprise an indication of some or all of the changes (e.g., detected by the change event generation process 314) that have been executed with respect to the particular extensible object model. In one example, the recovery service 338 may be configured to determine a baseline and/or default extensible object model associated with the particular extensible object model (e.g., from which the particular extensible object model was generated and/or representing an initial and/or default state of the particular extensible object model) and may generate the recovered extensible object model 340 corresponding to the particular extensible object model by generating a new extensible object model based at least in part on (e.g., a copy of) the baseline and/or default extensible object model associated with the particular extensible object model and committing to the new extensible object model the changes detected with respect to the particular extensible object model and/or indicated in the subset of change events 318 associated with the particular extensible object model, thus producing the recovered extensible object model 340 corresponding to the particular extensible object model (e.g., matching the particular extensible object model). The recovery service 338 may be configured to provide the recovered extensible object models 340 to the enterprise management system 120 and/or store the recovered extensible object models 340 in the graph database 308, to list a few examples.

In some embodiments, the extensible object model system 140 may be configured to store (e.g., in the one or more data repositories 150) and/or maintain one or more baseline and/or default extensible object models, which may be predefined and/or each of which may correspond to an operational system type associated with a particular set of operational systems 110 and/or a model type associated with a particular set of the extensible object models. These baseline and/or default extensible object models may be used (e.g., by the enterprise management system 120 and/or the extensible object model system 140) in creating new extensible object models in addition to being used by the recovery service 338 in generating the recovered extensible object models 340.

Having described example systems and/or apparatuses of the present disclosure, example flowcharts including various operations performed by the apparatuses and/or systems described herein will now be discussed. It should be appreciated that each of the flowcharts depicts an example computer-implemented process that may be performed by one or more of the apparatuses, systems, and/or devices described herein, for example utilizing one or more of the components thereof. The blocks indicating operations of each process may be arranged in any of a number of ways, as depicted and described herein. In some such embodiments, one or more blocks of any of the processes described herein occur in-between one or more blocks of another process, before one or more blocks of another process, and/or otherwise operates as a sun-process of a second process. Additionally or alternatively, any of the processes may include some or all of the steps described and/or depicted, including one or more optional operational blocks in some embodiments. With respect to the flowcharts discussed below, one or more of the depicted blocks may be optional in some, or all, embodiments of the disclosure. Similarly, it should be appreciated that one or more of the operations of each flowchart may be combinable, replaceable, and/or otherwise altered as described herein.

FIGS. 4-9 illustrate flowcharts including operational blocks of example processes in accordance with at least some example embodiments of the present disclosure. In some embodiments, the computer-implemented processes of FIGS. 4-9 are each embodied by computer program code stored on a non-transitory computer-readable medium of a computer program product configured for execution to perform the computer-implemented method. Alternatively or additionally, in some embodiments, the example processes of FIGS. 4-9 are performed by one or more specially configured computing devices, such as the specially configured apparatus 200 (e.g., via data intake circuitry 212, change event circuitry 210, notification circuitry 214, recovery circuitry 216, and/or audit report circuitry 218). In this regard, in some such embodiments, the apparatus 200 is specially configured by computer program instructions stored thereon, for example in the memory 204 and/or another component depicted and/or described herein, and/or otherwise accessible to the apparatus 200, for performing the operations as depicted and described with respect to the example processes of FIGS. 4-9. In some embodiments, the specially configured apparatus 200 includes and/or otherwise is in communication with one or more external apparatuses, systems, devices, and/or the like, to perform one or more of the operations as depicted and described. While the operational blocks of each of the example processes are depicted in each of FIGS. 4-9 in a particular order, this should not be understood as requiring that such operations be performed in the particular order shown or in sequential order, or that all illustrated operations be performed.

FIG. 4 illustrates a flowchart including operational blocks of an example process 400 for generating and using change events, in accordance with at least some example embodiments of the present disclosure.

The process 400 begins at operation 402, at which an apparatus (such as, but not limited to, the apparatus 200 or circuitry thereof as described above in connection with FIG. 2) detects changes to one or more extensible object models. In various embodiments, the extensible object model(s) for which the changes are detected in operation 402 may correspond to the extensible object model(s) representing the operational system(s) 110 and maintained by the extensible object model system 140 as defined and described with respect to FIG. 1 and/or those stored in the graph database 308 as described with respect to FIG. 3. The detected changes may correspond to those generated by the enterprise management system 120, those indicated in the model transactions 306 received by the transaction event handling service 302, and/or the model changes 312 executed by the transaction event handling service 302, as defined and described with respect to FIG. 3. Additionally, operation 402 may comprise some or all of the analogous functionality attributed to the change event generation process 314 as described with respect to FIG. 3.

At operation 404 of the process 400, an apparatus (such as, but not limited to, the apparatus 200 or circuitry thereof described above in connection with FIG. 2), in response to detecting the changes at operation 402, generates change events representing the detected changes. The change events generated at operation 404 may comprise and/or correspond to the change events 318 as defined and described with respect to FIG. 3, and generating the change events at operation 404 may comprise some or all of the analogous functionality attributed to the change event generation process 314 as described with respect to FIG. 3. In one example, the change events may be generated at operation 404 based at least in part on publish events generated by and received from the enterprise management system 120, such as the publish events 316 defined and described with respect to FIG. 3.

At operation 406 of the process 400, an apparatus (such as, but not limited to, the apparatus 200 or circuitry thereof described above in connection with FIG. 2) stores the change events generated at operation 404. In various embodiments, the change events may be stored at operation 406 in the one or more data repositories 150 defined and described with respect to FIG. 1 and/or in the document database 320 as defined and described with respect to FIG. 3. Moreover, storing the change events at operation 406 may comprise some or all of the analogous functionality attributed to the change event generation process 314 as described with respect to FIG. 3.

At operation 408 of the process 400, an apparatus (such as, but not limited to, the apparatus 200 or circuitry thereof described above in connection with FIG. 2) transmits the change events generated at operation 404 to the enterprise management system 120. In various embodiments, the change events transmitted to the enterprise management system 120 at operation 408 may comprise and/or correspond to the change events 318 transmitted to the enterprise management system 120 via the change event interface(s) 330 in response to the change event requests 332 generated by and received from the enterprise management system 120 as defined and described with respect to FIG. 3. Additionally, transmitting the change events to the enterprise management system 120 at operation 408 may comprise some or all of the analogous functionality attributed to the change event request service 328 as described with respect to FIG. 3.

At operation 410 of the process 400, an apparatus (such as, but not limited to, the apparatus 200 or circuitry thereof described above in connection with FIG. 2) causes the enterprise management system 120 to perform one or more monitoring/control operations with respect to the operational system(s) 110 based at least in part on the change events generated at operation 404 and transmitted to the enterprise management system at operation 408. In various embodiments, causing the enterprise management system 120 to perform the monitoring/control operation(s) at operation 410 may comprise causing the enterprise management system 120 to present some or all of the data contained in the change events (e.g., via user devices 160), generate further changes to the extensible object model(s) based at least in part on some or all of the data contained in the change events, generate updated operational data processing criteria based at least in part on the change events, and/or sending control data and/or signals to the operational system(s) 110 (and/or assets thereof) based at least in part on the change events, to list a few examples.

FIG. 5 illustrates a flowchart including operational blocks of an example process 500 for providing change events via a change event interface, in accordance with at least some example embodiments of the present disclosure.

The process 500 begins at operation 502, at which an apparatus (such as, but not limited to, the apparatus 200 or circuitry thereof as described above in connection with FIG. 2) presents one or more change event interfaces. The change event interface(s) presented at operation 502 may comprise and/or correspond to the change event interface(s) 330 defined and described with respect to FIG. 3. Moreover, presenting the change event interface(s) at operation 502 may comprise some or all of the analogous functionality attributed to the change event request service 328 as described with respect to FIG. 3.

At operation 504 of the process 500, an apparatus (such as, but not limited to, the apparatus 200 or circuitry thereof described above in connection with FIG. 2) receives change event requests via the change event interface(s) presented at operation 502. In various embodiments, the change event requests may comprise and/or correspond to the change event requests 332 as defined and described with respect to FIG. 3, and/or these change event requests may be generated by and/or received from the enterprise management system 120 as described with respect to FIG. 3. Receiving the change event requests at operation 504 may comprise some or all of the analogous functionality attributed to the change event request service 328 as described with respect to FIG. 3.

At operation 506 of the process 500, an apparatus (such as, but not limited to, the apparatus 200 or circuitry thereof described above in connection with FIG. 2) transmits change events to the enterprise management system 120 in response to receiving the change event requests at operation 504 and/or based at least in part on the change event requests received at operation 504. In various embodiments, transmitting the change events to the enterprise management system 120 at operation 506 may comprise and/or correspond to some or all of the analogous functionality of operation 408 of the process 400 as defined and described with respect to FIG. 4.

FIG. 6 illustrates a flowchart including operational blocks of an example process 600 for generating change notifications, in accordance with at least some example embodiments of the present disclosure.

The process 600 begins at operation 602, at which an apparatus (such as, but not limited to, the apparatus 200 or circuitry thereof as described above in connection with FIG. 2) generates change events. In various embodiments, the change events generated at operation 602 may comprise and/or correspond to those generated at operation 404 of the process 400, and generating the change events at operation 602 may comprise and/or correspond to some or all of the analogous functionality of operation 404 of the process 400 as defined and described with respect to FIG. 4.

At operation 604 of the process 600, an apparatus (such as, but not limited to, the apparatus 200 or circuitry thereof described above in connection with FIG. 2), in response to generation of the change events at operation 602, generates one or more change notifications corresponding to and/or based at least in part on the change events. In various embodiments, the change notifications generated at operation 604 may be generated based at least in part on configurable and/or predefined notification criteria. The change notification(s) generated at operation 604 may comprise and/or correspond to the change notifications 326 as defined and described with respect to FIG. 3, and generating the change notification(s) at operation 604 may comprise some or all of the analogous functionality attributed to the notification service 322 as described with respect to FIG. 3. Moreover, the notification criteria based on which the change notification(s) may be generated at operation 604 may comprise and/or correspond to the notification criteria 324 as defined and described with respect to FIG. 3, and generating the change notification(s) based at least in part on the notification criteria may comprise some or all of the analogous functionality attributed to the notification service 322 as described with respect to FIG. 3.

At operation 606 of the process 600, an apparatus (such as, but not limited to, the apparatus 200 or circuitry thereof described above in connection with FIG. 2) causes the enterprise management system 120 to perform one or more monitoring and/or control operations with respect to the operational system(s) 110 based at least in part on the change notifications generated at operation 604. In various embodiments, causing the enterprise management system 120 to perform the monitoring/control operation(s) at operation 606 may comprise transmitting the change notification(s) generated at operation 604 to the enterprise management system 120, and such transmission of the change notification(s) to the enterprise management system 120 may be based on the notification criteria referred to with respect to operation 604 and/or may comprise some or all of the analogous functionality attributed to the notification service 322 as described with respect to FIG. 3. Moreover, causing the enterprise management system 120 to perform the monitoring/control operation(s) at operation 606 may comprise and/or correspond to some or all of the analogous functionality of operation 410 of the process 400 as defined and described with respect to FIG. 4. In one example, causing the enterprise management system 120 to perform the monitoring/control operation(s) at operation 606 may comprise causing the enterprise management system 120 to generate one or more change event requests, transmitting change events to the enterprise management system 120 in response to and/or based on the change event requests, and causing the enterprise management system 120 to perform additional monitoring/control operation(s) based at least in part on the requested and received change events. These additional monitoring/control operation(s) may correspond to and/or comprise some or all of the monitoring/control operation(s) caused at operation 410 as described with respect to FIG. 4.

FIG. 7 illustrates a flowchart including operational blocks of an example process 700 for generating a recovered extensible object model, in accordance with at least some example embodiments of the present disclosure.

The process 700 begins at operation 702, at which an apparatus (such as, but not limited to, the apparatus 200 or circuitry thereof as described above in connection with FIG. 2) generates and stores change events associated with one or more extensible object models representing one or more operational systems 110. In various embodiments, the change events generated at operation 702 may comprise and/or correspond to the change events generated and stored at operations 404 and 406 as described with respect to FIG. 4, and generating and storing the change events at operation 702 may comprise some or all of the analogous functionality of and/or may be comprised by operations 404 and/or 406 of the process 400 as described with respect to FIG. 4.

At operation 704 of the process 700, an apparatus (such as, but not limited to, the apparatus 200 or circuitry thereof described above in connection with FIG. 2) retrieves a subset of the change events generated and stored at operation 702, including, for example, some or all of the change events associated with a particular extensible object model for which the recovered extensible object model is to be generated. In various embodiments, the subset of the change events retrieved at operation 704 may comprise and/or correspond to the analogous subset of change events 318 associated with a particular extensible object model as defined and described with respect to FIG. 3, and retrieving the subset of change events at operation 704 may comprise some or all of the analogous functionality attributed to the recovery service 338 as described with respect to FIG. 3.

At operation 706 of the process 700, an apparatus (such as, but not limited to, the apparatus 200 or circuitry thereof described above in connection with FIG. 2) generates a recovered extensible object model based at least in part on the subset of change events retrieved at operation 704. In one example, the recovered extensible object model may be generated at operation 706 in response to determining that a particular extensible object model (e.g., with which the retrieved subset of change events is associated) has been damaged, corrupted, lost, and/or changed in an undesired manner, and/or the recovered extensible object model generated at operation 706 may be a reconstructed copy of a particular extensible object model (e.g., with which the retrieved subset of change events is associated). Additionally or alternatively, the recovered extensible object model generated at operation 706 may be generated in response to a request for the recovered extensible object model (e.g., generated by and received from the enterprise management system 120). Moreover, the recovered extensible object model generated at operation 706 may correspond to and/or may be included by the recovered extensible object models 340 defined and described with respect to FIG. 3, and generating the recovered extensible object model at operation 706 may comprise some or all of the analogous functionality attributed to the recovery service 338 as described with respect to FIG. 3.

FIG. 8 illustrates a flowchart including operational blocks of an example process 800 for generating a change audit report, in accordance with at least some example embodiments of the present disclosure.

The process 800 begins at operation 802, at which an apparatus (such as, but not limited to, the apparatus 200 or circuitry thereof as described above in connection with FIG. 2) generates and stores change events associated with one or more extensible object models representing one or more operational systems 110. In various embodiments, the change events generated at operation 802 may comprise and/or correspond to the change events generated and stored at operations 404 and 406 as described with respect to FIG. 4, and generating and storing the change events at operation 802 may comprise some or all of the analogous functionality of and/or may be comprised by operations 404 and/or 406 of the process 400 as described with respect to FIG. 4.

At operation 804 of the process 800, an apparatus (such as, but not limited to, the apparatus 200 or circuitry thereof described above in connection with FIG. 2) retrieves a subset of the change events generated and stored at operation 802, including, for example, some or all of the change events associated with a particular extensible object model for which the change audit report is to be generated. In various embodiments, the subset of the change events retrieved at operation 804 may comprise and/or correspond to the analogous subset of change events 318 associated with a particular extensible object model as defined and described with respect to FIG. 3, and retrieving the subset of change events at operation 804 may comprise some or all of the analogous functionality attributed to the audit report service 334 as described with respect to FIG. 3.

At operation 806 of the process 800, an apparatus (such as, but not limited to, the apparatus 200 or circuitry thereof described above in connection with FIG. 2) generates a change audit report based at least in part on the subset of change events retrieved at operation 804. In one example, the change audit report may identify and/or characterize all or a selected subset of changes to a particular extensible object model (e.g., with which the retrieved subset of change events is associated). The change audit report generated at operation 806 may be generated in response to a request for the change audit report (e.g., generated by and received from the enterprise management system 120). Moreover, in various embodiments, the change audit report generated at operation 806 may correspond to and/or may be included by the change audit reports 336 defined and described with respect to FIG. 3, and generating the change audit report at operation 806 may comprise some or all of the analogous functionality attributed to the audit report service 334 as described with respect to FIG. 3.

FIG. 9 illustrates a flowchart including operational blocks of an example process 900 for updating operational data processing criteria, in accordance with at least some example embodiments of the present disclosure.

The process 900 begins at operation 902, at which an apparatus (such as, but not limited to, the apparatus 200 or circuitry thereof as described above in connection with FIG. 2) generates change events associated with one or more extensible object models representing one or more operational systems 110. In various embodiments, the change events generated at operation 902 may comprise and/or correspond to the change events generated at operation 404 as described with respect to FIG. 4, and generating the change events at operation 902 may comprise some or all of the analogous functionality of and/or may be comprised by operation 404 of the process 400 as described with respect to FIG. 4.

At operation 904 of the process 900, an apparatus (such as, but not limited to, the apparatus 200 or circuitry thereof described above in connection with FIG. 2) causes the enterprise management system 120 to generate updated operational data processing criteria based at least in part on the change events generated at operation 902 and to process operational data associated with and/or collected from the operational system(s) 110 based at least in part on the updated operational data processing criteria. In various embodiments, the operational data processed at operation 904 may comprise and/or correspond to the operational data defined and described with respect to FIG. 1 and/or the operational data 344 defined and described with respect to FIG. 3.

The operational data processing criteria may comprise configuration data that is retrieved and denormalized from the extensible object model(s) and that defines the functionality of the enterprise management system 120 and/or related systems and/or sub-systems with respect to the extensible object model(s) and/or any objects represented therein (e.g., including determining how messages generated with respect to objects represented in the object model(s) are processed, determining how operational data collected from the operational system(s) is normalized and enriched during normal operation of the operational system(s) 110). The enterprise management system 120 (e.g., via the extensible object model system 140) may be configured to selectively retrieve and/or denormalize the configuration data from the extensible object model(s) based at least in part on the change events.

In one example, causing the enterprise management system 120 to generate the updated operational data processing criteria at operation 904 may comprise causing the enterprise management system 120 (e.g. in response to, for example, change events from the extensible object model system 140) to generate updated operational data processing criteria (e.g., by retrieving and/or denormalizing updated configuration data from the extensible object model(s)) only with respect to a newly generated change event and/or in response to generation and/or notification of a change event (as opposed to in response to every individual change processed for the extensible object model(s)). In a similar example, causing the enterprise management system 120 to generate the updated operational data processing criteria at operation 904 may comprise causing the enterprise management system 120 to generate updated operational data processing criteria (e.g., by retrieving and/or denormalizing updated configuration data from the extensible object model(s)) only with respect to a newly received or generated publish event and/or in response to receiving or detecting generation of a publish event (as opposed to in response to every individual change processed for the extensible object model(s)). In another example, causing the enterprise management system 120 to generate the updated operational data processing criteria at operation 904 may comprise causing the enterprise management system 120 to generate updated operational data processing criteria based directly on change events (e.g., reflecting changes to the operational data processing criteria indicated within the change events themselves), avoiding the need to retrieve and/or denormalize the updated configuration data from the extensible object model(s) and the costs associated therewith.

Although example processing systems have been described in the figures herein, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communications network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communications network. Examples of communications networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communications network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

What is claimed is:

1. An apparatus comprising at least one processor and at least one non-transitory memory comprising program code stored thereon, wherein the at least one non- transitory memory and the program code are configured to, with the at least one processor, cause the apparatus to at least:
    detect changes to one or more extensible object models representing one or more operational systems;
    determine whether one or more notifications is to be generated for the detected changes based on one or more notification criteria, wherein the one or more notification criteria is based on a type of a change event to the one or more extensible object models;
    in response to the determination, generate the one or more notifications comprising change events representing the detected changes based at least in part on the detected changes, wherein the change events include one or more one changed attributes of an extensible object model represented as a delta between a previous instance of the extensible object model and a changed instance of the extensible object model;
    store the change events in one or more data repositories associated with an enterprise management system for managing the one or more operational systems;
    transmit the change events to the enterprise management system for managing one or more operational systems;
    update an operational data processing criteria based at least in part on the detected change events;
    cause the enterprise management system to perform one or more monitoring and control operations with respect to the one or more operational systems based at least in part on the change events, wherein a control operation corresponds to changing a physical operation of at least one operational system of the one or more operational systems; and
    display the change events on a user interface for a particular extensible object model of the one or more extensible object models upon a request through the enterprise management system based at least in part on a subset of the change events associated with the particular extensible object model.

2. The apparatus of claim 1, wherein the at least one non-transitory memory and the program code are configured to, with the at least one processor, further cause the apparatus to at least:
    present a change event interface configured to receive change event requests;
    receive change event requests from the enterprise management system via the change event interface; and
    transmit the change events to the enterprise management system in response to receiving the change event requests based at least in part on the change event requests.

3. The apparatus of claim 1, wherein the at least one non-transitory memory and the program code are configured to, with the at least one processor, further cause the apparatus to at least:
    generate change notifications based at least in part on the change events;
    transmit the change notifications to the enterprise management system; and
    cause the enterprise management system to perform the one or more monitoring and control operations with respect to the one or more operational systems based at least in part on the change notifications.

4. The apparatus of claim 3, wherein the change notifications are generated based at least in part on configurable notification criteria.

5. The apparatus of claim 3, wherein generating the change notifications comprises generating at least one change notification corresponding to a change event in response to determining that all changes to an extensible object model, of the one or more extensible object models, indicated in the change event are complete.

6. The apparatus of claim 1, wherein the at least one non-transitory memory and the program code are configured to, with the at least one processor, further cause the apparatus to at least:
generate a recovered extensible object model corresponding to the particular extensible object model of the one or more extensible object models based at least in part on the subset of the change events associated with the particular extensible object model.

7. The apparatus of claim 1, wherein the at least one non-transitory memory and the program code are configured to, with the at least one processor, further cause the apparatus to at least:
generate a change audit report for the particular extensible object model of the one or more extensible object models based at least in part on the subset of the change events associated with the particular extensible object model, wherein the change audit report comprises a change log indicating all changes to the particular extensible object model.

8. The apparatus of claim 1, wherein the at least one non-transitory memory and the program code are configured to, with the at least one processor, further cause the apparatus to at least:
cause the enterprise management system to process operational data associated with the one or more operational systems based at least in part on the updated operational data processing criteria, wherein the updated operational data processing criteria defines a manner in which the collected operational data from the one or more operational systems is to be normalized.

9. The apparatus of claim 1, wherein the one or more extensible object models are stored in a graph database, and the change events are defined in a file or data interchange format and are stored in a document database.

10. The apparatus of claim 1, wherein each of the change events comprises a change event identifier and change data characterizing one or more changes, of the detected changes, associated with the particular extensible object model of the one or more extensible object models, including one or more one changed attributes of the particular extensible object model, a previous value of each of the one or more changed attributes, and a changed value of each of the one or more changed attributes.

11. A computer-implemented method comprising:
detecting changes to one or more extensible object models representing one or more operational systems;
determining whether one or more notifications is to be generated for the detected changes based on one or more notification criteria, wherein the one or more notification criteria is based on a type of a change event to the one or more extensible object models;
in response to the determination, generating the one or more notifications comprising change events representing the detected changes based at least in part on the detected changes, wherein the change events include one or more one changed attributes of an extensible object model represented as a delta between a previous instance of the extensible object model and a changed instance of the extensible object model;
storing the change events in one or more data repositories associated with an enterprise management system for managing the one or more operational systems;
transmitting the change events to the enterprise management system for managing one or more operational systems;
updating an operational data processing criteria based at least in part on the detected change events;
causing the enterprise management system to perform one or more monitoring and control operations with respect to the one or more operational systems based at least in part on the change events, wherein a control operation corresponds to changing a physical operation of at least one operational system of the one or more operational systems; and
displaying the change events on a user interface for a particular extensible object model of the one or more extensible object models upon a request through the enterprise management system based at least in part on a subset of the change events associated with the particular extensible object model.

12. The method of claim 11, further comprising:
presenting a change event interface configured to receive change event requests;
receiving change event requests from the enterprise management system via the change event interface; and
transmitting the change events to the enterprise management system in response to receiving the change event requests based at least in part on the change event requests.

13. The method of claim 11, further comprising:
generating change notifications based at least in part on the change events; and
transmitting the change notifications to the enterprise management system; and
causing the enterprise management system to perform the one or more monitoring and control operations with respect to the one or more operational systems based at least in part on the change notifications.

14. The method of claim 13, wherein the change notifications are generated based at least in part on configurable notification criteria.

15. The method of claim 13, wherein generating the change notifications comprises generating at least one change notification corresponding to a change event in response to determining that all changes to an extensible object model, of the one or more extensible object models, indicated in the change event are complete.

16. The method of claim 11, further comprising generating a recovered extensible object model corresponding to the particular extensible object model of the one or more extensible object models based at least in part on the subset of the change events associated with the particular extensible object model.

17. The method of claim 11, further comprising generating a change audit report for the particular extensible object model of the one or more extensible object models based at least in part on the subset of the change events associated with the particular extensible object model, wherein the change audit report comprises a change log indicating all changes to the particular extensible object model.

18. The method of claim 11, further comprising:
causing the enterprise management system to process operational data associated with the one or more operational systems based at least in part on the updated operational data processing criteria, wherein the updated operational data processing criteria defines a manner in which the collected operational data from the one or more operational systems is to be normalized.

19. The method of claim 11, wherein the one or more extensible object models are stored in a graph database, and the change events are defined in a file or data interchange format and are stored in a document database.

20. A computer program product comprising at least one non-transitory computer-readable storage medium having computer-readable program code portions stored therein, the computer-readable program code portions comprising an executable portion configured to:

detect changes to one or more extensible object models representing one or more operational systems;

determine whether one or more notifications is to be generated for the detected changes based on one or more notification criteria, wherein the one or more notification criteria is based on a type of a change event to the one or more extensible object models;

in response to the determination, generate the one or more notifications comprising change events representing the detected changes based at least in part on the detected changes, wherein the change events include one or more one changed attributes of an extensible object model represented as a delta between a previous instance of the extensible object model and a changed instance of the extensible object model;

store the change events in one or more data repositories associated with an enterprise management system for managing the one or more operational systems;

transmit the change events to the enterprise management system for managing one or more operational systems;

update an operational data processing criteria based at least in part on the detected change events;

cause the enterprise management system to perform one or more monitoring and control operations with respect to the one or more operational systems based at least in part on the change events, wherein a control operation corresponds to changing a physical operation of at least one operational system of the one or more operational systems; and display the change events on a user interface for a particular extensible object model of the one or more extensible object models upon a request through the enterprise management system based at least in part on a subset of the change events associated with the particular extensible object model.

* * * * *